Sept. 6, 1955

R. R. CROOKSTON 2,716,997

QUICK RELEASE TIMING VALVE

Filed Nov. 28, 1949

INVENTOR.
Robert R. Crookston,
BY
*James B. McCulloch*
ATTORNEY.

United States Patent Office 2,716,997
Patented Sept. 6, 1955

2,716,997

QUICK RELEASE TIMING VALVE

Robert R. Crookston, Houston, Tex., assignor, by mesne assignments, to Esso Research and Engineering Company, Elizabeth, N. J., a corporation of Delaware Application November 28, 1949, Serial No. 129,731

6 Claims. (Cl. 137—102)

The present invention is directed to a quick release valve with an orifice for controlling the rate of loading. This quick release valve is particularly suited for timing the filling of volumes, such as boosters or clutches, with compressed air and unloading them very rapidly.

In many commercial applications, such as pump and engine clutches of industrial engines, it is desirable to use compressed air for controlled mechanisms and have in the system a valve capable of releasing air pressures very rapidly, and also capable of controlling the rates of filling a volume fairly accurately. It is desirable that this valve operate without chatter and that it be rugged and capable of resisting exposure to moisture and grease.

The valve of the present application is capable of controlling the rate of filling a volume accurately and at the same time permits a rapid exhaust when releasing air from said volumes. In the opening operation the air is required to flow through an orifice of fixed size and in unloading the air must flow through a larger orifice of fixed size. Movable portions are sealed in a fluid-tight manner and move rapidly from one position to another without chatter. In addition, the valve of the present application affords straight through flow from inlet to delivery thus making it simple and easy to install. The valve may easily be constructed in small dimensions and light in weight so that it is suitable for mounting on a moving part such as a fly wheel or clutch.

Other advantages of the present invention will be seen from the following description taken in conjunction with the drawing in which Fig. 1 is a view partly in section of an embodiment of the present invention with the valve parts in delivery position;

Figure 1:
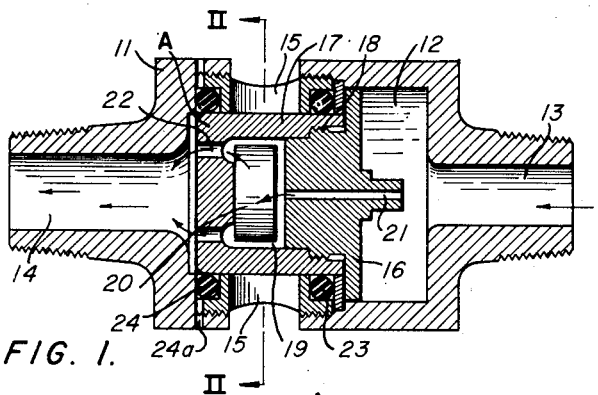

The first embodiment will now be described with reference to Figs. 1 to 3.

The valve consists of a valve body 11 having a central passage 12, an inlet port 13, a delivery port 14 and exhaust ports 15. Slidably mounted in the central passage of the valve body 11 is a movable valve element A consisting of members 16 and 17 fastened together by suitable means such as screw threads 18 and cooperating to form a central passage 19 in which a movable member 20 is arranged. Member 16 has an axial orifice 21 and member 17 has a plurality of spaced passages 22. A sealing ring 23 is mounted in valve body 11 to make a fluid-tight seal at all times between the valve body and the outside surface of member 17 of movable valve member A. Another sealing member 24 is mounted in valve body 11 so that it makes a fluid-tight seal with the outside surface of member 17 of movable valve member A when valve A is in its first or air delivery position as shown in Fig. 1. With this arrangement of seals the exhaust ports 15 are sealed from the inlet and delivery ports when the movable valve member A is in air delivery position, but there is no seal between the delivery port and the exhaust ports when the valve is in its second or exhaust position since it is unnecessary to provide any seal between the delivery port and the exhaust ports at this time.

When the parts of the valve of the first embodiment are in the air delivery position as shown in Fig. 1, movable valve member A has moved to the left with the exterior surface of member 17 in contact with seals 23 and 24. In valve member A movable member 20 is also moved to its left position so that air can pass from inlet port 13 through orifice 21 into the central passage 19, thence through orifice 22 and into delivery port 14. In Fig. 3 valve member A is shown in its exhaust position. Delivery port 14 and exhaust ports 15 are fluidly connected through central passage 12 of valve body 11. Member 20 of movable valve element A has moved to the right and sealed orifice 21 so that the delivery port 13 is sealed from exhaust port 15 and delivery port 14.

Figure 2:
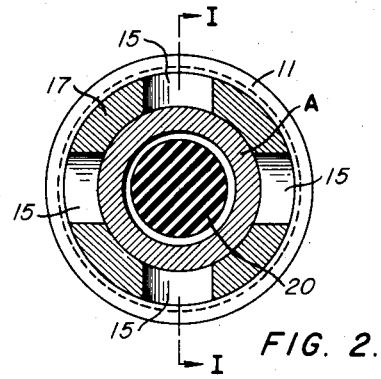
Fig. 2 is a view taken along line II—II of Fig. 1.
Figure 3:
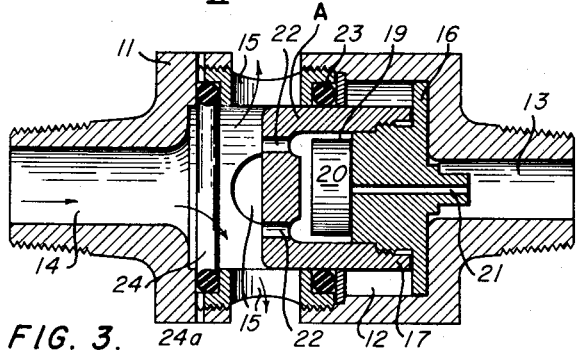
Fig. 3 is a view of the embodiment of Fig. 1 with the valve parts in exhaust position.
Figure 4:
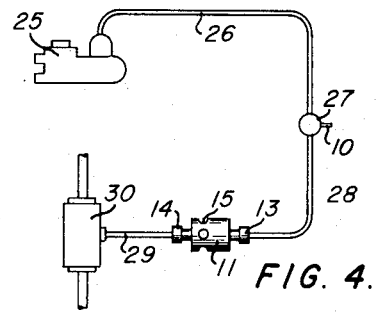
Fig. 4 is a piping diagram showing an elevation of the embodiment of Figs. 1, 2, and 3 in a typical installation.

In Fig. 4 is shown a typical installation of the embodiment of Figs. 1, 2, and 3. In this figure air compressor 25 is connected through conduit 26 to the inlet side of valve 27. The outlet side of valve 27 is connected through conduit 28 to the inlet port 13 of valve body 11. Delivery port 14 of valve body 11 is connected by conduit 29 to air operated clutch 30. When clutch 30 is to be loaded, valve 27 is opened. This causes element A in valve 11 (not shown in Fig. 4) to be forced to its first position as shown in Fig. 1, allowing air to flow at a controlled rate through orifice 21, thence through passage 19 and openings 22 to delivery port 14 and then through conduit 29 to clutch 30. The valve element A will remain in its first position as long as the air pressure in conduit 28 is greater than or equal to the air pressure in conduit 29. When it is desired to unload the clutch, valve 27 is closed. This severs the fluid connection between conduits 26 and 28 and bleeds air from conduit 28 through bleeder 10 and reduces the pressure in inlet port 13 below that in delivery port 14. This causes the assembly A in valve 11 to move to exhaust position (as shown in Fig. 3) thereby allowing compressed air from air operated clutch 30 to exhaust through conduit 29, delivery port 14, central passage 12 of valve body 11, and thence through exhaust ports 15.

Figure 5:
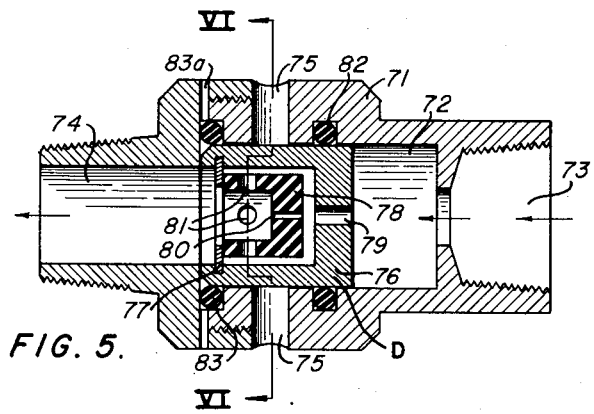
Fig. 5 is an elevation partly in section showing another embodiment of the present invention with the valve parts in delivery position.
Figure 6:
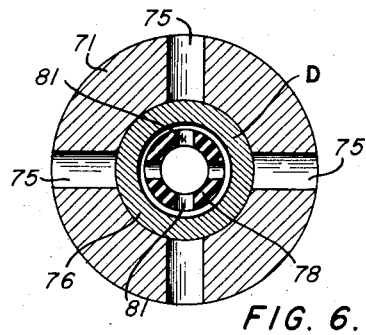
Fig. 6 is a view taken along line VI—VI of Fig. 5.
Figure 7:
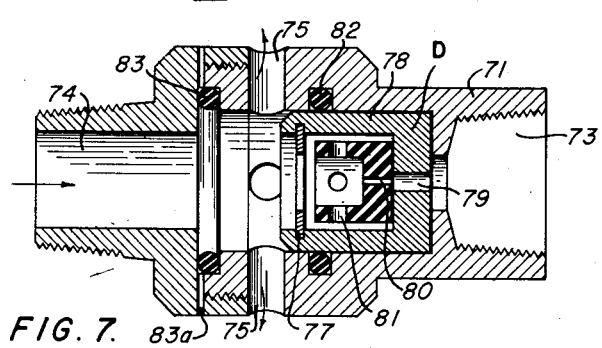
Fig. 7 is a view of the embodiment of Fig. 5 showing the valve parts in exhaust position.

Another embodiment of the present invention is shown in Figs. 5, 6, and 7. In Fig. 5 the valve parts are in delivery position and in Fig. 7 they are in the exhaust position.

The embodiment of Figs. 5, 6, and 7 consists of a valve body 71 having central passage 72, inlet port 73, delivery port 74 and exhaust ports 75. Movable valve element D is slidably arranged in central passage 72. Movable valve element D consists of member 76, retaining ring 77 and slidable member 78. Member 76 has an axial orifice 79. Slidable member 78 has an axial orifice 80 and side ports 81. Valve body 71 is provided with sealing member 82 which makes a seal between the outside surface of member 76 and the valve body at all times and with sealing member 83 which makes the seal between the valve body and member 76 when valve element D is in the delivery or first position as shown in Fig. 5.

The embodiment of Figs. 5, 6, and 7 does not completely seal off the inlet port 73 from delivery port 74 when its parts are in the exhaust position as shown in Fig. 4. In this position element 78 has its right end in contact with the inner radial surface of member 76 and this seals off the air flow through ports 81 but orifice 80 allows fluid communication between inlet port 73, delivery port 74 and exhaust port 75. However, as conventionally employed, as by substituting the embodiment of Figs. 5, 6, and 7 for that of the embodiment of Figs. 1, 2, and 3 in Fig. 4, valve 27 prevents any compressed air from the air supply means (compressor 25) from flowing to inlet port 73 when the valve port D is in the exhaust position. The embodiment of Figs. 5, 6, and 7 has the advantage that if an operator decides to make an application and then quickly changes his mind, the setting of the valve is not changed. For example, if the embodiment of Figs. 5, 6, and 7 were substituted for the embodiment of Figs. 1, 2, and 3 in the system of Fig. 4, changing the setting of valve 27 only momentarily will not allow sufficient air pressure to be applied against the movable valve element D to change the setting thereof. If the valve is in its delivery position as shown in Fig. 5 and valve 27 is closed momentarily, the excess pressure momentarily exerted at delivery port 74 is bled off through both orifice 80 and side ports 81, and then through passage 79 so that the position of element D is not changed. If the valve D is in its exhaust position as shown in Fig. 7 and valve 27 is opened momentarily, the excess pressure momentarily exerted at inlet port 73 is bled off through orifices 79 and 80.

It will be understood that the valve of the present invention may have the sizes of the various parts and the proportions between the various parts changed over a wide range and satisfactory results will be obtained. However, by way of specific examples the following are given. In the embodiment of Figs. 1, 2, and 3, as one example, inlet port 13 is 5/16 inch in diameter, outlet port 14 is 3/8 inch in diameter, the end of valve element A adjacent inlet port 13 is 1¼ inches in diameter, the end of element A adjacent delivery port 14 is 1 inch in diameter, and orifice 21 is 1/64 inch in diameter. Valve member A is provided with 8 openings 22, each 3/32 inch in diameter. Valve body 11 has six exhaust ports 15, each 5/16 inch in diameter.

Another set of dimensions found satisfactory for the embodiment of Figs. 1, 2, and 3 is as follows: Inlet port 3/16 inch in diameter, outlet port ½ inch in diameter, and four exhaust ports each 7/32 inch in diameter. The end of movable valve assembly A adjacent inlet port 13 is 5/8 inch in diameter, and the end adjacent delivery port 14 is ½ inch in diameter with eight openings 22, each 1/32 inch in diameter.

Dimensions suitable for the embodiment of Figs. 5, 6, and 7 are: Inlet port 3/8 inch in diameter, delivery port ¾ inch in diameter, and six exhaust ports 75, each ¼ inch in diameter. Central passage 79 and movable valve element D is 1/8 inch in diameter, orifice 80 is 1/32 inch in diameter, and there are four ports 81, each 3/32 inch in diameter.

It is to be noted that the grooves shown in Figs. 1, 3, 5, and 7 are provided with vents 24a and 83a to the exterior surface of the body members 11 and 71. These vents serve to maintain the sealing rings 24 and 83 in place when the members 17 and 78 move out of contact with the sealing rings 24 and 83 with a snap action.

While I have given specific embodiments of the present invention, it will be obvious to a workman skilled in the art that various changes may be made without departing from the scope of the invention.

Having fully described and illustrated preferred embodiments of the present invention, what I desire to claim as new and useful and to secure by Letters Patent is:

1. A quick release valve consisting of a valve body having an elongated passage with a cylindrical wall with an axial inlet port connecting to one end, an axial delivery port connecting to its other end, at least one radial exhaust port piercing the wall at a point between said inlet and said delivery port with a total effective exhaust port area at least a multiple of the total effective inlet port area, a first stop shoulder and a second stop shoulder spaced away from said first stop shoulder along the longitudinal axis of the valve body, a first circular sealing ring groove in the cylindrical wall of the body between the inlet port and the exhaust port and a second circular sealing ring groove in the cylindrical wall of the body between the exhaust port and the delivery port with a vent communicating the second circular sealing ring groove with an exterior surface of the body, first and second circular sealing rings arranged in the first and second grooves respectively, a movable valve member with a cylindrical outer surface and first and second end surfaces perpendicular thereto with no opening in the outer wall surface between said first and second end surfaces, said valve member being in the elongated passage with its outer cylindrical surface continuously in contact with the first sealing ring and arranged to assume a delivery position with its second end surface resting against the second stop shoulder and the outer wall of the valve member in sealing contact with the second as well as with the first sealing ring, said valve member being longitudinally movable along the axis of the valve body from said delivery position to an exhaust position where its second end surface is clear of the exhaust port and its first end surface is in contact with said first stop shoulder.

2. A quick release valve consisting of a valve body having an elongated passage with a cylindrical wall with an axial inlet port connecting to one end and an axial delivery port connecting to its other end, at least one radial exhaust port piercing the wall at a point between said inlet port and said delivery port with a total effective exhaust port area at least a multiple of the total effective inlet port area and a first stop shoulder and a second stop shoulder spaced away from said first stop shoulder along the longitudinal axis of the valve body, a first circular sealing ring groove in the cylindrical wall of the body between the inlet port and the exhaust port and a second circular sealing ring groove in the cylindrical wall of the body between the exhaust port and the delivery port with a vent communicating the second circular sealing ring groove with an exterior surface of the body, first and second circular sealing rings of circular cross section arranged in the first and second grooves respectively, a movable valve member with a cylindrical outer wall surface and first and second end surfaces perpendicular thereto with a bevelled surface making an obtuse angle with the cylindrical surface connecting the second end surface with said cylindrical surface, there being no opening in the outer wall of the valve member between the first and second end surfaces, said valve member being in the elongated passage with its outer cylindrical passage in sealing contact continuously with the first sealing ring and arranged to assume a delivery position with its second end surface resting against the second stop shoulder and its outer wall in sealing contact with the second sealing ring as well as the first sealing ring, with only the bevelled surface of the cylindrical portion of the outer surface of the valve member extending beyond the second sealing ring and longitudinally movable along the axis of the valve body from delivery position to an exhaust position where its second end surface is clear of the exhaust port and its first end surface is in contact with said first stop shoulder.

3. A quick release valve consisting of a valve body having an axially extending cylindrically walled passage with an axial inlet port connecting to one end, an axial delivery port connecting to its other end, at least one radial exhaust port piercing the wall at a point between said inlet and said delivery port with a total effective exhaust port area at least a multiple of the total effective inlet port area, a first stop shoulder and a second stop shoulder spaced away from said first stop shoulder along the longitudinal axis of the valve body, a circular sealing ring groove in the cylindrical wall of the body between the exhaust port and the delivery port with a vent communicating the circular sealing ring groove with an exterior surface of the body, a first circular sealing ring arranged in said groove, a movable cylindrical valve member with an end surface perpendicular to its axis, an uninterrupted cylindrical outer sealing surface terminating at said end in a sealing end surface, an orifice passage of substantially less effective diameter than the inlet port joining points on each side of said uninterrupted cylindrical outer sealing surface, and spaced first and second stop surfaces perpendicular to said cylindrical sealing surface, said valve member being in the axially extending cylindrically walled passage of the valve body and arranged to assume a delivery position with its sealing end surface in contact with said first sealing ring and with its first stop shoulder in contact with the first stop shoulder of said body and longitudinally movable along the axis of the body from said delivery position to an exhaust position with its second stop surface in contact with the second stop shoulder of said body, a second circular sealing ring arranged to remain in continuous sealing contact with the outer cylindrical surface of said valve member and with the cylindrical wall of the body at a point between the inlet port and the exhaust port for each position said valve member assumes.

4. A quick release valve consisting of a valve body having an axially extending cylindrically walled passage with an axial inlet port connected to one end, an axial delivery port connected to its other end, at least one radial exhaust port piercing the wall at a point between said inlet and said delivery port with a total effective port area at least a multiple of the total inlet port area, a first stop shoulder and a second stop shoulder spaced away from said first stop shoulder along the longitudinal axis of the valve body, a circular sealing ring groove in the cylindrical wall of the body between the exhaust port and the delivery port, a first circular sealing ring arranged in said groove, a cup shaped valve member with a cavity opening bounded by an annular first end, having a cylindrical second end pierced by an axial orifice of substantially less effective area than the inlet area of said valve body, an uninterrupted cylindrical outer surface directly joining said second end and connected to the first annular end through a bevelled annular surface which makes an obtuse angle with the cylindrical surface, a cup shaped slidable member with a cylindrical wall pierced by radial ports, a first annular end, a second circular end pierced by an axial port smaller than the axial port of the valve member and slidably arranged within said cavity of the valve member with its circular end adjacent the circular end of the valve member and its annular end adjacent the annular end of the valve member, a retaining ring carried by the valve member for retaining said movable element within said cavity of said valve member, said valve member being in the cylindrically walled passage of the valve body and arranged to assume a delivery position with its bevelled sealing end surface in contact with said first sealing ring and its first stop shoulder in contact with the first stop shoulder of the body and longitudinally movable along the axis of the body from said delivery position to an exhaust position with its second stop surface in contact with the second stop shoulder of said body and a second circular sealing ring arranged to maintain continuous sealing contact with the outer sealing surface of said valve member and with the cylindrical wall of the body at a point between the inlet port and the exhaust port for each position said valve member assumes.

5. A valve in accordance with claim 4 in which the circular sealing ring groove in the cylindrical wall of the body is provided with a vent communicating the circular sealing ring groove with an exterior surface of the body.

6. A quick release valve consisting of a valve body having an axially extending cylindrically walled passage with an axial inlet port connected to one end, an axial delivery port connected to its other end, at least one radial exhaust port piercing the wall at a point between said inlet and said delivery port with a total effective port area at least a multiple of the total inlet port area, a first stop shoulder and a second stop shoulder spaced away from said first stop shoulder along the longitudinal axis of the valve body, a circular sealing ring groove in the cylindrical wall of the body between the exhaust port and the delivery port, a first circular sealing ring arranged in said groove, a cup shaped valve member with a cavity opening bounded by an annular first end, having a cylindrical second end pierced by an axial orifice of substantially less effective area than the inlet area of said valve body, an uninterrupted cylindrical outer surface directly joining said second end and connected to the first annular end through a bevelled annular surface which makes an obtuse angle with the cylindrical surface, a cup shaped slidable member with a cylindrical wall, a first annular end, a second circular end slidably arranged within said cavity of the valve member with its circular end adjacent the circular end of the valve member and its annular end adjacent the annular end of the valve member, a retaining ring carried by the valve member for retaining said slidable member within said cavity of said valve member, said valve member being in the cylindrically walled passage of the valve body and arranged to assume a delivery position with its bevelled sealing end surface in contact with said first sealing ring and its first stop shoulder in contact with the first stop shoulder of the body and longitudinally movable along the axis of the body from said delivery position to an exhaust position with its second stop surface in contact with the second stop shoulder of said body, and a second circular sealing ring arranged to maintain continuous sealing contact with the outer sealing surface of said valve member and with the cylindrical wall of the body at a point between the inlet port and the exhaust port for each position said valve member assumes.

References Cited in the file of this patent

UNITED STATES PATENTS

| | | |
|---|---|---|
| 2,270,549 | Orr | Jan. 20, 1942 |
| 2,367,682 | Kehle | Jan. 23, 1945 |
| 2,471,725 | Clifford | May 31, 1949 |
| 2,485,504 | Morgan | Oct. 18, 1949 |
| 2,488,949 | Walsh | Nov. 22, 1949 |